United States Patent
Nagata et al.

(10) Patent No.: US 6,519,408 B2
(45) Date of Patent: Feb. 11, 2003

(54) PLAYBACK CONTROL APPARATUS FOR CONTROLLING A PLAYBACK UNIT AND A RECEIVER UNIT

(75) Inventors: Koichiro Nagata, Takatsuki (JP); Takaaki Hoshi, Ibaraki (JP); Masashi Imai, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/900,737

(22) Filed: Jul. 25, 1997

(65) Prior Publication Data

US 2001/0010749 A1 Aug. 2, 2001

(30) Foreign Application Priority Data

Jul. 25, 1996 (JP) .............................. 8-195875

(51) Int. Cl.[7] .............................. H04N 5/76; H04N 5/92
(52) U.S. Cl. ........................................... 386/46; 386/68
(58) Field of Search ........................... 386/1, 9, 21, 39, 386/46, 95, 96, 98, 113, 52, 64; 348/189, 180, 177, 10, 11, 678, 687; 345/327; H04N 5/76, 5/92, 17/00, 5/57, 7/10

(56) References Cited

U.S. PATENT DOCUMENTS

| | | | | |
|---|---|---|---|---|
| 5,032,926 A | * | 7/1991 | Imai et al. ..................... | 386/52 |
| 5,541,780 A | * | 7/1996 | Han ............................. | 386/72 |
| 5,625,739 A | * | 4/1997 | Kotani .......................... | 386/52 |
| 5,715,352 A | * | 2/1998 | Han ............................. | 386/46 |
| 5,815,631 A | * | 9/1998 | Sugiyama et al. ............. | 386/46 |
| 5,825,965 A | * | 10/1998 | Kizu ............................ | 386/52 |
| 5,875,278 A | * | 2/1999 | Kasuga et al. ................ | 386/96 |
| 5,982,980 A | * | 11/1999 | Tada ............................ | 386/96 |
| 6,008,836 A | * | 12/1999 | Bruck et al. .................. | 348/10 |
| 6,031,962 A | * | 2/2000 | Sawabe et al. ................ | 386/96 |

FOREIGN PATENT DOCUMENTS

| | | |
|---|---|---|
| EP | 0 535 749 | 4/1993 |
| JP | 60-47373 | 4/1985 |
| JP | 7-240882 | 9/1995 |

\* cited by examiner

*Primary Examiner*—Thai Tran
(74) *Attorney, Agent, or Firm*—RatnerPrestia

(57) ABSTRACT

In a display device used together with a playback apparatus such as an optical disk, a control is provided responding to a playback signal from an playback apparatus in order to prevent burn-out of CRT phosphor or deterioration of phosphor. A first controller controls the playback apparatus, and a second controller controls the display device, and those two controllers communicate with each other, thereby recognizing an operation status and a display status. Thus those two controllers control circuits and apparatus including a video control circuit which controls a contrast, whereby optimizing a display on a screen, and control status of an audio output, a power supply controller, and a playback apparatus controller.

25 Claims, 6 Drawing Sheets

PLAYBACK CONTROL APPARATUS FOR CONTROLLING A PLAYBACK UNIT AND A RECEIVER UNIT

FIELD OF THE INVENTION

The present invention relates to a playback control apparatus used together with a playback device such as digital video disk (DVD), video compact disk (VCD), video cassette recorder (VCR), or the like. The present invention also relates to a television receiver (TV) when the TV is used as a replacement for the above playback control apparatus. The present invention further relates to a technique applicable to a device such as a television monitor or a TV, both having the ability to view played back material.

BACKGROUND OF THE INVENTION

When a playback control apparatus is used with a conventional playback device such as DVD, VCD, VCR or the like as a system, a control device which controls those apparatus is occasionally designed to switch an output signal of the playback apparatus to/from a television receiving signal, and also control the playback apparatus at the same time.

For example, Japanese Patent Application Publication H07-240882 discloses a control device of a TV which has a playback apparatus: when a user displays a television broadcasting program on a TV screen while the user operates the playback apparatus, this control device first stops the operation of the playback apparatus, then selects a television signal with a switch. If the stop will last for a specified period, a power supply for the playback apparatus is then turned off. As explained above, one action of the user ignites the control device to work relevant control operations sequentially, i.e. switching the two signal sources with ease.

A playback apparatus attached to a TV through which the playback apparatus can be controlled is disclosed in Japanese Utility Model Publication S60-47373: this TV includes a terminal tapping off of a remote control signal, and thereby controlling the outside apparatus with the remote control signal; however, a control function of the television monitor used together with those conventional playback apparatus, or that of the TV having the built-in playback apparatus, is limited only to hold the operation of the playback apparatus, to switch an input signal to another input signal, and to turn off the power of the playback apparatus after the specified period. In other words, the controllable functions of this control device only covers related operations between those apparatus, and neither covers the operation of the playback apparatus, nor optimizes a display responding to the condition of the playback apparatus.

As a result, when a cathode ray tube (CRT) is used as a display device of the monitor or the TV, the control device cannot control the display device. Thus, for example, a playback signal which has been paused may burn out a spot of the CRT screen, or lower phosphor characteristics. Further, when switching to a playback mode, an unnecessary circuit may remain active, and the control device may not deactivate unnecessary circuits at all, thereby loosing an opportunity to save energy.

These problems are also applicable to other display devices including a liquid crystal display (LCD) and a plasma display. When a CRT projector is used as a display device, the lens coating may be deteriorated due to excessive heating.

SUMMARY OF THE INVENTION

A playback control apparatus according to the present invention comprises:

a playback unit for reproducing a video signal and/or an audio signal, (2) a display device for displaying the reproduced video signal and/or audio signal, (3) a playback and/or display control device for controlling the display responding to a playback status. A control device deactivates unnecessary circuits in order to save energy of the system.

DETAILED DESCRIPTION OF THE EXEMPLARY EMBODIMENTS

Exemplary Embodiment 1

Figure 1:
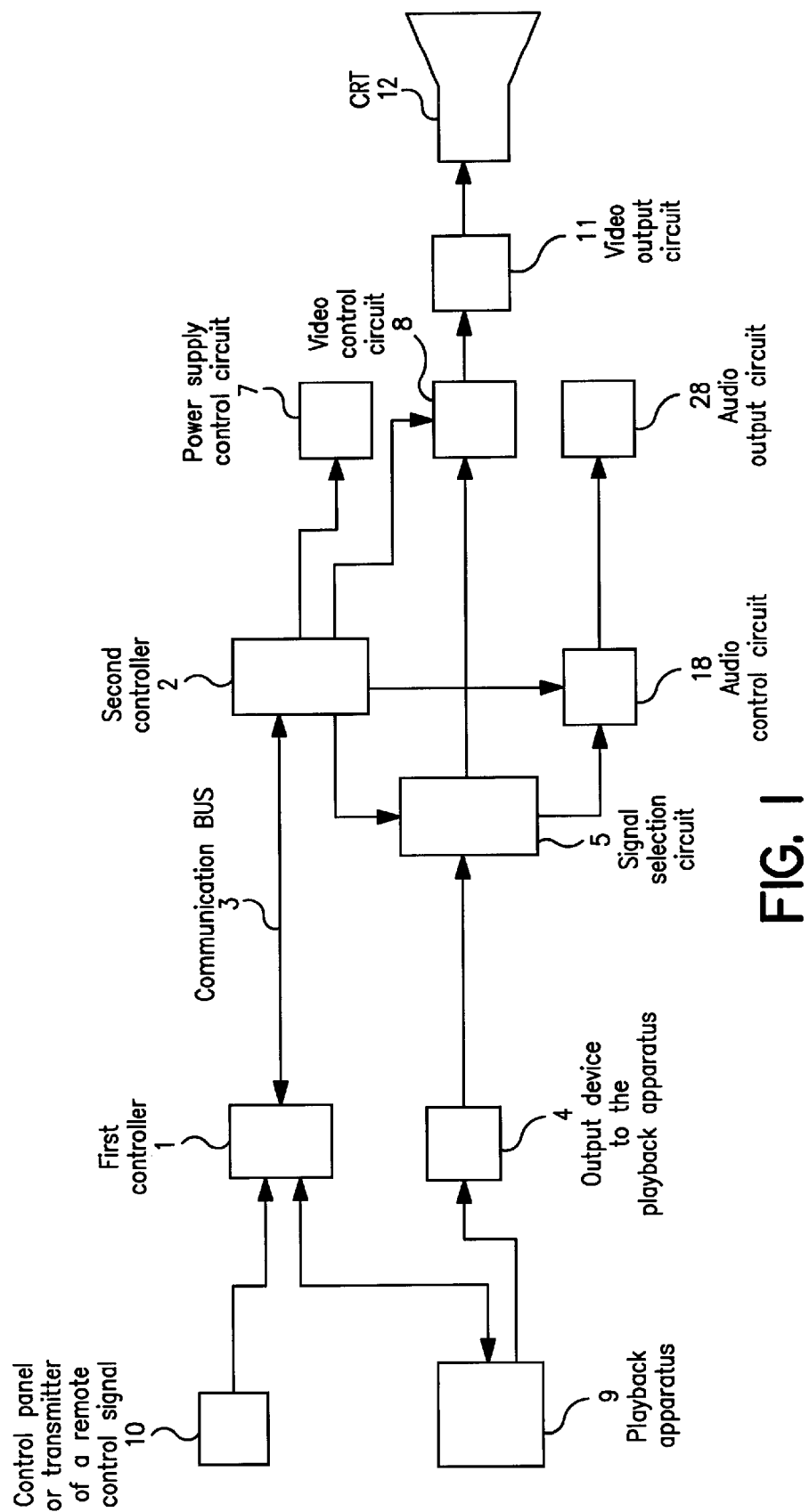
FIG. 1 is a block diagram of the playback control apparatus according to Exemplary Embodiment 1 of the present invention.

FIG. 1 is a block diagram of the playback control apparatus according to Exemplary Embodiment 1 of the present invention. A display device in FIG. 1 comprises: a second controller 2, a signal selection circuit 5, a video control circuit 8, a video output circuit 11, a CRT 12, an audio control circuit 6, an audio output circuit 13 and a power supply control circuit 7. A control panel, or a remote control transmitter 10 is also used.

A first controller 1 which controls playback status (e.g. on, off, pause, play, etc.) of the playback apparatus 9 and the second controller 2 which controls (e.g. on, off, picture characteristics, etc.) the display device, are coupled with a communication bus 3, and they can communicate with each other, thereby monitoring a controlled status, i.e. a playback status and a display status.

A video signal and an audio signal tapped off from an output device 4 of the playback apparatus are fed into the signal selection circuit 5 which is controlled by the second controller 2.

At least one pair of the playback apparatus 9 and output device 4 is considered in this exemplary embodiment, and at least two signals including a television signal are fed into the signal selection circuit 5.

For classification purposes only, one single input signal is shown fed into the signal selection circuit 5 shown in FIG. 1 through FIG. 6. It is understood, however, that multiple signals may be used.

The video signal selected in the signal selection circuit 5 travels through the video modification circuit 8, and is amplified in the video output circuit 11, then drives the CRT 12, and finally a video is reproduced on the CRT 12.

A video setting on the CRT 12 is controlled by the second controller 2 in the video control circuit 8.

The audio signal selected in the signal selection circuit 5 is fed into the audio modification circuit 6, and tapped off from the audio output circuit 13. The audio setting in the audio output circuit 13 is controlled by the second controller 2 in the audio control circuit 6. The second controller 2 also controls the power supply control circuit 7.

The control panel or the transmitter 10 of remote controlling signal is coupled with the first controller 1 or second controller 2, and an output signal tapped off from the control panel or the transmitter 10 controls the first controller 1 or second controller 2.

When the signal selection circuit 5 selects video and audio signals tapped off from the output device 4 of the playback apparatus, and at the same time the playback apparatus 9 outputs a still video signal, the first controller 1 recognizes that the video signal is a still video image based on an output status of the video signal, and then informs the second controller 2 via the communication bus 3 of what it has recognized.

When a user instructs the playback apparatus 9 to be in a still mode through the control panel or the transmitter 10 of a remote control signal, the first controller 1 turns the playback apparatus 9 to a still mode and also informs the second controller 2 via the communication bus 3 of that the output of the playback apparatus 9 has been placed in.

When the user instructs the playback apparatus 9 to output a still video signal through the control panel or the transmitter 10 of a remote control signal, the first controller 1 informs the second controller 2 via the communication bus 3 that the playback apparatus 9 is generating a still video signal.

The second controller 2 counts the duration time of the still mode based on the information from the first controller 1, and if the duration time exceeds the predetermined time, the second controller 2 controls the video control circuit 8 to lower the video contrast.

This control prevents a burn-out on the CRT 12 phosphor, for when a still video is displayed thereon, the phosphor thereof is burnt by a beam current that is lower than that of a moving video.

When the signal selection circuit 5 selects the video and audio signals taped off from the output device 4 of the playback apparatus 9, and at the same time when the playback apparatus 9 is in a stop or halt mode, the first controller 1 recognizes that the playback apparatus is in a stop or halt mode, and then informs the second controller 2 via the communication bus 3 of what is recognized.

The second controller 2 counts a duration time of the stop or halt mode, and if the duration time exceeds the predetermined time, the second controller 2 controls the power supply control circuit 7 so that the power supply control circuit 7 maintains each apparatus and circuit, which constitute the system, to be in specified power supply status. As a result, the power supplied to each apparatus and circuit is minimized thereby saving the power.

The second controller 2 is described to control each power supply of the system elements by using the power supply control circuit 7 attached to the display device; however, the first controller 1 may control the power supply in the playback apparatus 9 based on the information through the communication bus 3.

When the output signal from the output device of the playback apparatus includes an audio signal and does not include a video signal, the first controller 1 informs the second controller 2 via the communication bus 3 that the operation of the playback apparatus only reproduces the audio signal. Thus, the second controller 2 minimizes the power to the circuits and apparatus other than those related to the audio signal, and thereby saving the power.

The same effect is available also in other display devices including an LCD, and a plasma display. When the display device is a CRT projector, in addition to the above effect, the lens coating is prevented from being deteriorated due to excessive heating.

The present invention can control a display status of the display apparatus to be appropriate in line with a signal status reproduced by the playback apparatus.

A status of the signal reproduced is tapped off from the first controller 1 of the playback apparatus. Information tapped off from the first controller 1 of the playback apparatus is obtained through either one of the following signals:

(1) a control signal with which the controller 1 operates the playback apparatus (e.g. in direct; switching to the still mode, and indirectly; an operation accompanying a pattern of a still video, a superimposed dialogue, or a caption)

(2) a detection signal of the detector which detects a signal of a moving picture or a still picture by the detection signal (e.g. still video broadcasting, text display), (3) a detection signal of the detector which detects the maximum value of a reproduced output signal by the detection signal (e.g. zoom up shots in series with a high intensity)

These signals are only described with regard to Exemplary Embodiment 1. These signals, however, are applicable to Exemplary Embodiment 1 through Exemplary Embodiment 8.

Exemplary Embodiment 2

Figure 2:
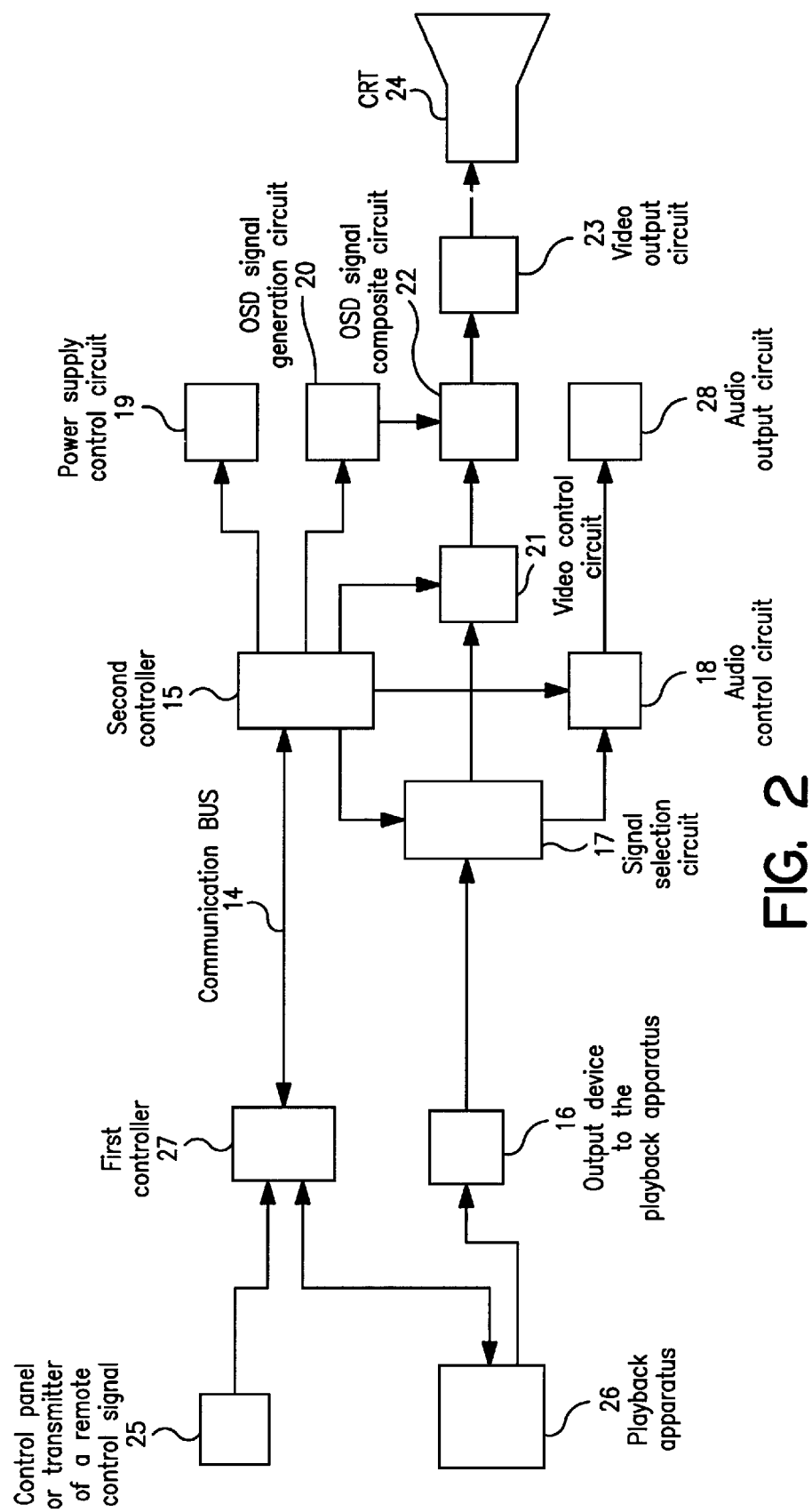
FIG. 2 is a block diagram of the playback control apparatus according to Exemplary Embodiment 2 of the present invention.

FIG. 2 is a system block diagram of a playback control apparatus accompanying a playback apparatus of Exemplary Embodiment 2 according to the present invention. A display device in FIG. 2 comprises (1) a second controller 15, (2) a signal selection circuit 17, (3) a video modification circuit 21, (4) an on screen display (OSD) signal composite circuit 22, (5) a video output circuit 23, (5) a CRT 24, (6) an audio modification circuit 18, (7) an audio output circuit 28, (8) a power supply control circuit 19, and (9) an OSD signal generation circuit 20.

A control panel or a transmitter 25 of a remote control signal is sometimes included in the display device; however, unless otherwise specified, the control panel or the transmitter 25 is included in the playback apparatus 26 for purposes of this application.

A first controller 27, which controls the playback apparatus 26, is coupled with the second controller 15, which controls the display device, through a communication bus 14, both the controller can communicate and recognize an operation status, i.e. playback and display status, with each other.

A video and an audio signal reproduced by an output device 16 of the playback apparatus is fed into the signal selection circuit 17 controllable by the second controller 15.

The OSD signal generation circuit 20 is controlled by the second controller 15 to generate a predetermined OSD signal.

A video signal selected in the signal selection circuit 17 is fed into the video control circuit 21 thereby being controlled, and then is composed with an OSD signal, which is generated in the OSD generation circuit 20, in the OSD signal composite circuit 22. The composite video signal is amplified in the video output circuit 23 to drive the CRT 24, thereby the video is displayed on the CRT 24.

A video setting status is controllable by the second controller 15 in the video modification circuit 21.

An audio signal selected by the signal selection circuit 17 is fed into the audio modification circuit 18, whereby being controlled, and then fed into the audio output circuit 28 where the audio output status is controllable by the second controller 15. The second controller 15 also controls the power supply control circuit 19.

The control panel or the transmitter 25 of a remote control signal, is coupled with the first controller 27 or second controller 15 to control whatever is coupled to it.

When the signal selection circuit 17 selects a video and an audio signal tapped off from the output device 16 of the playback apparatus, and at the same time the playback apparatus 9 outputs a still video signal (still mode), the first controller 27 recognizes that the video signal contains a still video based on an output status of a video signal which has been played back, and then informs the second controller 15 via the communication bus 14 of what it recognized.

When a user instructs the playback apparatus 26 to be in a still mode through the control panel or the transmitter 25 of a remote control signal, the first controller 27 turns the playback apparatus 26 to a still mode and also informs the second controller 15 via the communication bus 14 of turning an output of the playback apparatus 26 to a still mode.

When the user instructs the playback apparatus 26 to output a still video signal through the control panel or the transmitter 25 of a remote control signal, the first controller 27 informs the second controller 15 via the communication bus 14 that the playback apparatus 26 taps off a still video signal.

The second controller 15 counts the duration time of the still mode based on the information from the first controller 27, and if the duration time exceeds the predetermined time, the second controller 2 controls the video modification circuit 21 to lower the video contrast.

This control prevents a burn-out on the CRT 24, for when a still video is displayed thereon, the phosphor thereof is burnt by a lower beam current than that of a dynamic video.

Further, the second controller 15 controls the OSD signal generation circuit 20 to give the user notice that the CRT is now protected.

The second controller 15 controls the OSD signal generation circuit 20 instead of the video modification circuit 21, in order to display an OSD signal including appropriate intensity and movement so that burn-out of the CRT phosphor is prevented. The burn-out of the CRT phosphor can be thus prevented.

When the signal selection circuit 17 selects the video and audio signals taped off from the output device of the playback apparatus 26, and at the same time when the playback apparatus 26 is in a stop or halt mode, the first controller 27 recognizes the playback apparatus is in a stop or halt mode, and then informs the second controller 15 via the communication bus 14 of what is recognized.

The second controller 15 counts a duration time of the stop or halt mode, and if the duration time exceeds the predetermined time, the second controller 15 controls the power supply control circuit 19 so that the power supply control circuit 19 maintains each apparatus and circuit, which constitute the system, to be in specified power supply status. As a result, the power supplied to each apparatus and circuit is minimized thereby saving power.

The second controller 15 is described as the power supply control circuit 19 attached to the display device, which controls each power supply of system elements; however, the first controller 27 may control the power supply in the playback apparatus 26 based on the information through the communication bus 14.

When the output signal from the output device 16 of the playback apparatus includes an audio signal and does not include a video signal, the first controller 27 informs the second controller 15 via the communication bus 14 that the operation of the playback apparatus only reproduces the audio signal. Thus, the second controller 15 minimizes the power to the circuits and apparatus other than those related to the audio signal, and thereby saving power. Power to the television monitor is thus saved.

Exemplary Embodiment 3

Figure 3:
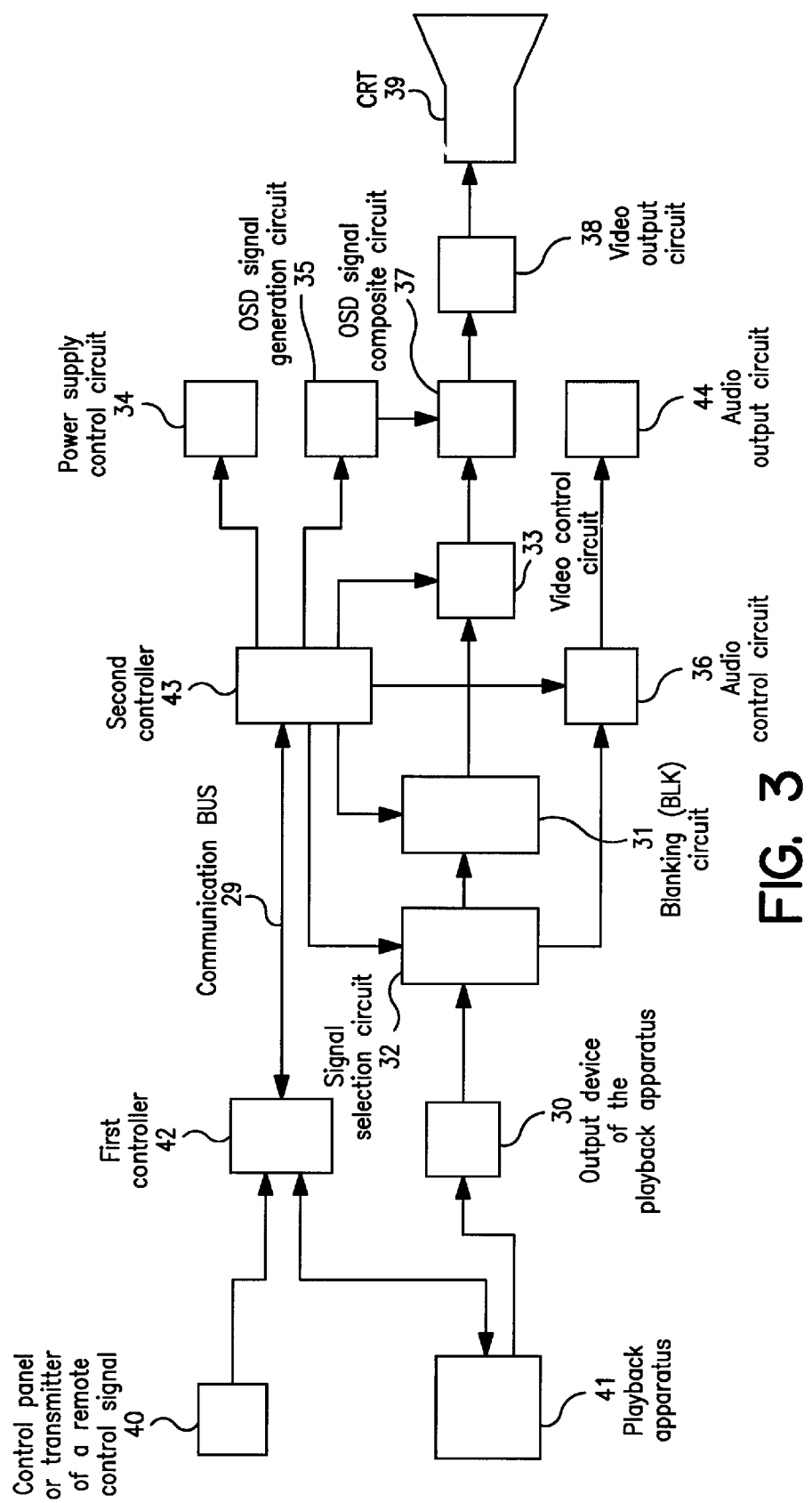
FIG. 3 is a block diagram of the playback control apparatus according to Exemplary Embodiment 3 of the present invention.

FIG. 3 is a block diagram depicting a system structure of a playback control apparatus accompanying a playback apparatus used in Exemplary Embodiment 3. A display device in FIG. 3 comprises (1) a second controller 43, (2) a blanking circuit (BLK) circuit 31, (3) a signal selection circuit 32, (4) a video modification circuit 33, (5) a power supply control circuit 34, (6) a video output circuit 38, (7) a CRT 39, (8) an audio modification circuit 36, (9) an audio output circuit 44, (10) an OSD signal generation circuit 35. And an OSD signal composite circuit 37.

A control panel or a transmitter 40 of a remote control signal is sometimes included in the display device; however, unless otherwise specified, it is included in the playback apparatus 41.

A first controller 42, which controls the playback apparatus 41, is coupled with the second controller 43, which controls the display device, through a communication bus 29, whereby both the controller can communicate and recognize an operation status, i.e. playback and display status, with each other.

A video and an audio signal reproduced by an output device 30 of the playback apparatus is fed into the signal selection circuit 32 controllable by the second controller 43.

A selected video signal by the signal selection circuit 32 is fed into the BLK circuit 31, which is controlled by the second controller 43 and cuts off a video signal and an audio signal at an arbitrary timing, both signals are tapped off from the output device 30 of the playback apparatus.

An output video signal from the BLK circuit 31 is fed into the video modification circuit 33 which is controlled by the second controller 43.

The OSD signal generation circuit 35 is controlled by the second controller 43 to generate a predetermined OSD signal.

The video output signal form the video modification circuit 33 is composed with an OSD signal, which is generated in the OSD generation circuit 35, in the OSD signal composite circuit 37. The composite video signal is amplified in the video output circuit 38 to drive the CRT 39, whereby the video is displayed on the CRT 39. A video setting status is controllable by the second controller 43.

An audio signal selected by the signal selection circuit 32 is fed into the audio modification circuit 36, thereby being controlled, and then tapped off from the audio output circuit 44 where the audio output status is controllable by the second controller 43. The second controller 43 also controls the power supply control circuit 34.

The control panel or the transmitter 40 of a remote control signal, is coupled with the first controller 42 or second controller 43 to control whatever is coupled to it.

When the signal selection circuit 32 selects a video and an audio signal tapped off from the output device 30 of the playback apparatus, and at the same time the playback apparatus 41 outputs a still video signal (still mode), the first controller 42 recognizes that the video signal contains a still video based on an output status of a video signal played back, and then informs the second controller 43 via the communication bus 29 of what it has recognized.

The second controller 43 counts the duration time of the still mode based on the information from the first controller 42, and if the duration time exceeds the predetermined time, the second controller 42 controls the video control circuit 33 to lower the video contrast.

This control prevents a burn-out on the CRT 39, for when a still video is displayed thereon, the phosphor thereof is burnt by a lower beam current than that of a moving video.

Further the second controller 43 counts the duration time of a still mode based on the information from the first controller 42, and if the duration time exceeds the predetermined time, the second controller 43 controls the OSD signal generation circuit 35 to give a user a notice that the CRT is now protected.

The second controller 43 counts the duration time of a still mode based on the information from the first controller 42, and if the duration time exceeds the predetermined time, the second controller 43 controls the OSD signal generation circuit 35 instead of the video control circuit 33, in order to display an OSD signal including appropriate intensity and movement so that burn-out of the CRT phosphor is prevented. The burn-out of the CRT phosphor can be thus prevented.

The second controller 43 counts the duration time of the still mode, and if the duration time exceeds the predetermined time, the second controller 43 drives the BLK circuit 31 and cuts off the video signal tapped off from the output device 30 of the playback apparatus in order to prevent the CRT phosphor from being burnt out. This method is also effective to prevent the burn-out on the CRT phosphor.

When the signal selection circuit 32 selects the video and audio signal taped off from the output device 30 of the playback apparatus, and at the same time when the playback apparatus 41 is in a stop or halt mode, the first controller 42 recognizes the playback apparatus is in a stop or halt mode, and then informs the second controller 43 via the communication bus 29 of what is recognized.

The second controller 43 counts a duration time of the stop or halt mode, and if the duration time exceeds the predetermined time, the second controller 43 controls the power supply control circuit 34 so that the power supply control circuit 34 maintains each apparatus and circuit, which constitute the system, to be in specified power supply status. As a result, the power supplied to each apparatus and circuit is minimized thereby saving power.

When the playback apparatus reproduces only an audio signal and does not include a video signal, the first controller 42 informs the second controller 43 via the communication bus 29 that the output of the output device 30 only reproduces the audio signal. Thus, the second controller 43 minimizes the power supplied to the circuits and apparatus other than those related to the audio signal, and thereby saving power.

Exemplary Embodiment 4

Figure 4:
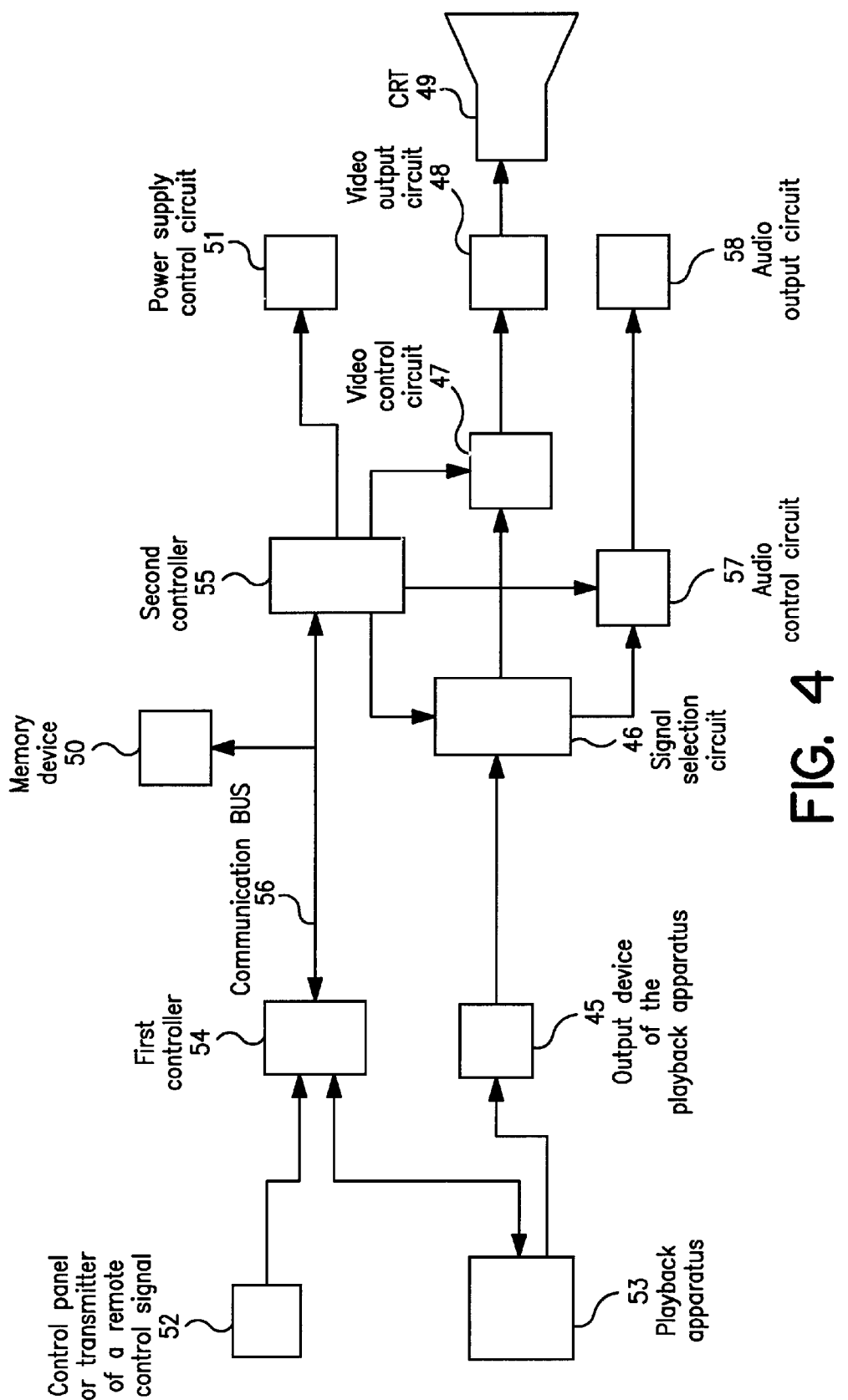
FIG. 4 is a block diagram of the playback control apparatus according to Exemplary Embodiment 4 and 6 of the present invention.

FIG. 4 is a block diagram depicting a system structure of a television monitor accompanying a playback apparatus, which is used in Exemplary Embodiment 4 of the present invention.

A display device in FIG. 4 comprises (1) a second controller 55, (2) a signal selection circuit 46, (3) a video output circuit 48, (4) a CRT 49, (5) an audio modification circuit 57, (6) an audio output circuit 58, (7) a power supply control circuit 51, (8) a video modification circuit 47, and (9) a memory device.

A first controller 54, which controls the playback apparatus 53, is coupled with the second controller 55, which controls the display device, through a communication bus 56, whereby both the controllers can communicate and recognize an operation status, i.e. playback and display status.

The second controller 55 can generate an OSD signal. A video signal and an audio signal tapped off from the output device 45 of the playback apparatus are fed into the signal selection circuit 46 which is controllable by the second controller 55.

A video signal selected in the signal selection circuit 46 is fed into the video modification circuit 47 thereby being controlled, and then is composed with an OSD signal, which is generated in the second controller 55. The composite video signal is amplified in the video output circuit 48 to drive the CRT 49, whereby the video is displayed on the CRT 49.

A video setting status is controllable by the second controller 55 in the video modification circuit 47.

An audio signal selected by the signal selection circuit 57 is fed into the audio modification circuit 57, thereby being controlled, and then fed into the audio output circuit 58 where the audio output status is controllable by the second controller 55. The second controller 55 also controls the power supply control circuit 51.

The control panel or the transmitter 52 of a remote control signal, is coupled with the first controller 54 or second controller 55 to control whatever is coupled to it.

The memory device 50 is coupled with the first controller 54 and the second controller 55 via the communication bus 56, and stores the controlled status of each control device.

When the signal selection circuit 46 selects the video and audio signals taped off from the output device 45 of the playback apparatus, and at the same, time when the playback apparatus 54 is in a stop or halt mode, the first controller 54 recognizes the playback apparatus is in a stop or halt mode, and then informs the second controller 55 via the communication bus 56 of what is recognized.

The second controller 55 counts a duration time of the still mode based on the information from the first controller 54, and if the duration time exceeds the predetermined time, the second controller 55 controls the video modification circuit 47 to lower the video contrast.

This control prevents a burn-out on the CRT 49, for when a still video is displayed thereon, the phosphor thereof is burnt by a beam current which is lower than that of a moving video.

Further the second controller 55 counts the duration time of a still mode based on the information from the first controller 54, and if the duration time exceeds the predetermined time, the second controller 55 generates an OSD signal and composites them in the video modification circuit 47, thereby giving a user a notice that the CRT is now protected.

The second controller 55 counts the duration time of a still mode based on the information from the first controller 54, and if the duration time exceeds the predetermined time, the second controller 55 generates the OSD signal instead of controlling the video control circuit 33, in order to display an OSD signal including appropriate intensity and movement so that burn-out of the CRT phosphor is prevented. The burn-out of the CRT phosphor can be thus prevented.

When the signal selection circuit 46 selects the video and audio signals taped off from the output device 45 of the playback apparatus, and at the same time when the playback apparatus 53 is in a stop or halt mode, the first controller 54 recognizes the playback apparatus is in a stop or halt mode, and then informs the second controller 55 via the communication bus 56 of what is recognized.

The second controller 55 counts a duration time of the stop or halt mode, and if the duration time exceeds the predetermined time, the second controller 55 controls the power supply control circuit 51 and its controllable circuits of each block to be in specified power supply status. As a result, the power supplied to each system element is minimized thereby saving power.

When turning off the display device and the playback apparatus, the second controller 55 stores the status of just before the halt mode into the memory device 50. The playback apparatus restarts the operation from the stored status when it is turned on.

When the playback apparatus reproduces only an audio signal and does not include a video signal, the first controller 54 informs the second controller 55 via the communication bus 56 that the output of the output device 45 only reproduces the audio signal. Thus, the second controller 55 minimizes the power supplied to the circuits and apparatus other than those participating to the audio signal, thereby saving power.

Exemplary Embodiment 5

Figure 5:
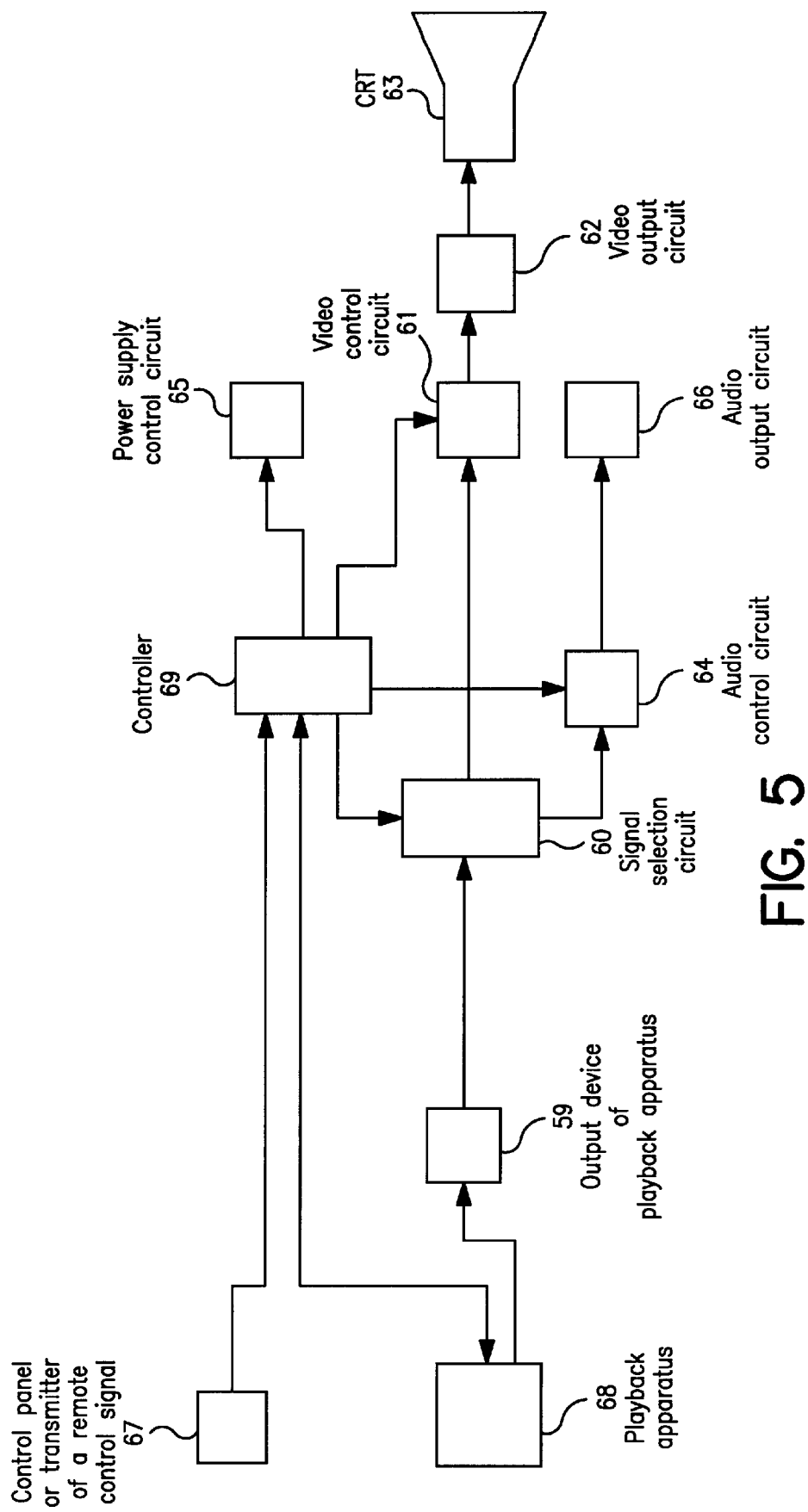
FIG. 5 is a block diagram of the playback control apparatus according to Exemplary Embodiment 5 of the present invention.

FIG. 5 is a block diagram depicting a system structure of a television monitor accompanying a playback apparatus, which is used in Exemplary Embodiment 5 of the present invention.

A display device in FIG. 5 comprises (1) a signal selection circuit 60, (2) a video output circuit 62, (3) a CRT 63, (4) an audio modification circuit 64, (5) an audio output circuit 66, and (6) a power supply control circuit 65.

A controller 69 which controls a playback apparatus 68 also controls the display device, and further generates an OSD signal.

A video signal and an audio signal tapped off from the output device 59 of the playback apparatus are fed into the signal selection circuit 60 which is controllable by the controller 69.

A video signal selected in the signal selection circuit 60 is fed into the video modification circuit 61 thereby being controlled, and then is composed with an OSD signal, which is generated in the controller 69. The composite video signal is amplified in the video output circuit 62 to drive the CRT 63, whereby the video is displayed on the CRT 63.

An audio signal selected by the signal selection circuit 60 is fed into the audio control circuit 64, thereby being controlled, and then fed into the audio output circuit 66 where the audio output status is controllable by the controller 69. The controller 69 also controls the power supply control circuit 65.

The control panel or the transmitter 67 of a remote control signal, is coupled with the controller 69 to control it.

When the signal selection circuit 60 selects the video and audio signals taped off from the output device 59 of the playback apparatus, and at the same time when the playback apparatus 68 is in a still mode, the controller 69 recognizes the playback apparatus is in a still mode, and then counts the duration time of the still mode.

If the duration time exceeds the predetermined time, the controller 69 controls the video modification circuit 61 to lower the video contrast of the still video displayed on the CRT 63 so that burn-out of CRT phosphor is prevented.

The controller 69 generates an OSD signal to give an operator a notice that the CRT is now protected, and the OSD signal is composited with a video signal in the video modification circuit 61. The composite signal is then displayed on the CRT. There is another method to prevent the burn-out of CRT phosphor; the controller 69 does not control the video modification circuit 61, but generates the OSD signal and displays it with an appropriate intensity as well as movement on the CRT so that the burn-out of the CRT phosphor is prevented.

When the signal selection circuit 60 selects the video and audio signals taped off from the output device 59 of the playback apparatus, and at the same time when the playback apparatus 68 is in a stop or halt mode, the controller 69 recognizes the playback apparatus is in a stop or halt mode, and counts the duration time thereof, and if the duration time exceeds the predetermined time, the controller 69 controls the power supply control circuit 65 to have its controllable circuits of each block be in specified power supply status. As a result, the power supplied to each system element is minimized thereby saving power.

When the playback apparatus reproduces only an audio signal and does not include a video signal, the controller 69 recognizes that the output of the output device 59 only reproduces the audio signal. Thus, the controller 69 minimizes the power supplied to the circuits and apparatus other than those participating to the audio signal, thereby saving power.

Exemplary Embodiment 6

In Exemplary Embodiment 4, the signal selection circuit 46, video control circuit 47, power supply control circuit 51 and audio modification circuit 57 are controllable by the second controller 55 which controls the display device; however, instead of the second controller 55, the first controller 54 controlling the playback apparatus 53 can be replaced.

Exemplary Embodiment 7

Figure 6:
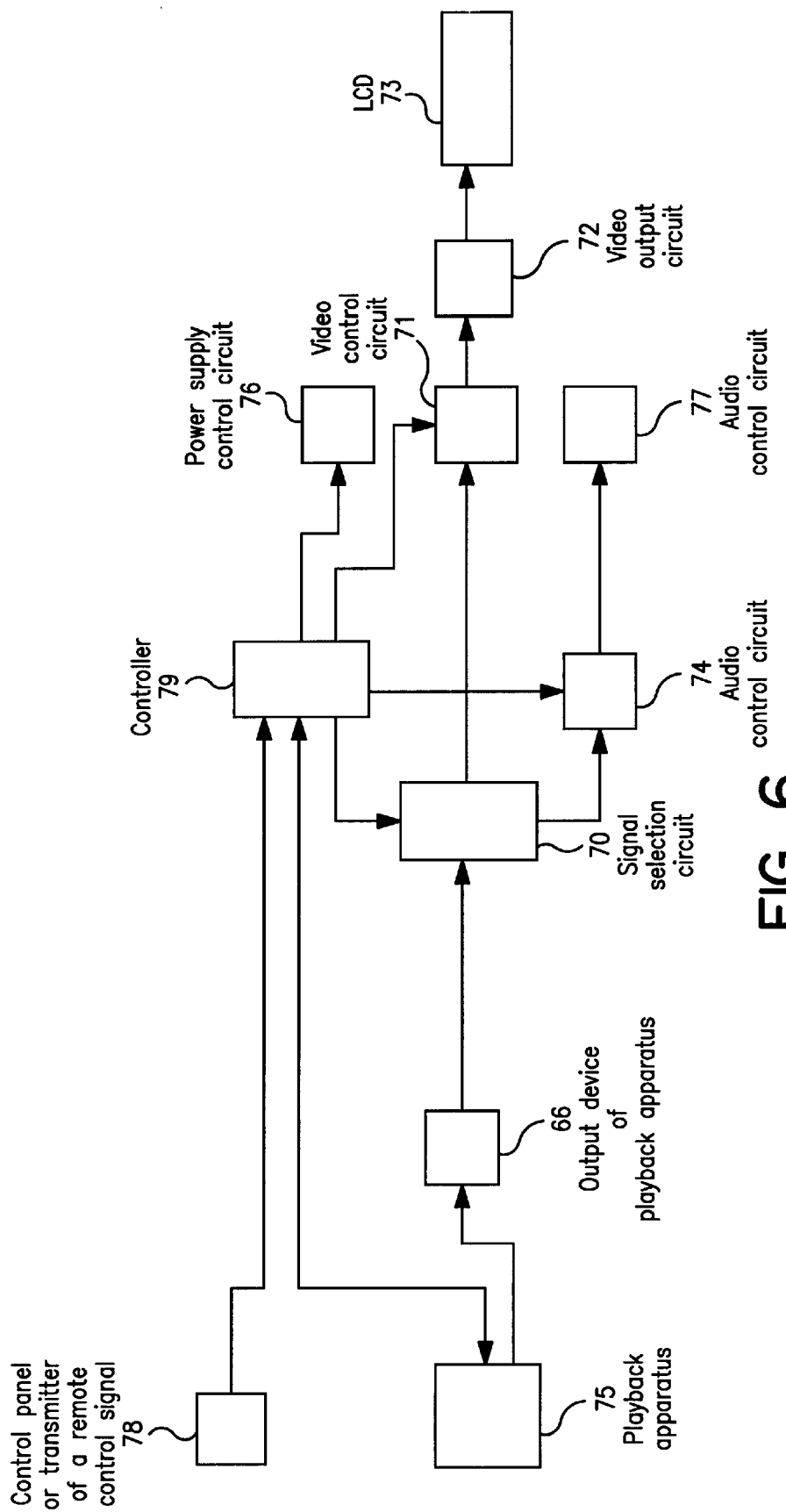
FIG. 6 is a block diagram of the playback control apparatus according to Exemplary Embodiments 7 and 8 of the present invention.

FIG. 6 is a block diagram depicting a system structure of a television monitor accompanying a playback apparatus, which is used in Exemplary Embodiment 7 of the present invention.

A display device in FIG. 6 comprises (1) a signal selection circuit 70, (2) a video modification circuit 71, (3) a video output circuit 72, (4) an LCD 73, (5) an audio modification circuit 74, (6) an audio output circuit 77, and (7) a power supply control circuit 76, i.e. the CRT in FIG. 5 is replaced with the LCD.

The second controller 55 can generate an OSD signal. A video signal and an audio signal tapped off from the output device 45 of the playback apparatus are fed into the signal selection circuit 46 which is controllable by the second controller 55.

A controller 79 which controls a playback apparatus 75 also controls the display device and further generates an OSD signal. A video signal and an audio signal tapped off from the output device of the playback apparatus are fed into the signal selection circuit 70 which is controlled by the controller 79, and the video signal selected by the signal selection circuit 70 is fed into the video modification circuit 71 thereby being controlled in a specified video setting status, and then is composed with an OSD signal, which is generated in the controller 79. The composite video signal is amplified in the video output circuit 72 to drive the LCD 73, whereby the video is displayed on the LCD 79.

An audio signal selected by the signal selection circuit 70 is fed into the audio control circuit 74, then fed into the audio output circuit 77. The audio output status is controllable by the controller 79. The controller 79 also controls the power supply control circuit 76.

The control panel or the transmitter 78 of a remote control signal, is coupled with the controller 79 to be controllable thereby.

When the signal selection circuit 70 selects the video and audio signals taped off from the output device 66 of the playback apparatus, and at the same time when the playback apparatus 68 is in a still mode, the controller 79 recognizes the playback apparatus 75 is in a still mode, and then counts a duration time of the still mode.

If the duration time exceeds the predetermined time, the controller 79 controls the video modification circuit 71 to apply a blanking on the video displayed on the LCD so that the characteristics of the LCD is prevented from being deteriorated.

The controller 79 generates an OSD signal to be composited with a video signal in the video modification circuit 71, and gives an operator a notice that the LCD is now protected. The composite signal is then displayed on the LCD. The controller 79 does not control the video modification circuit 71, but controls an intensity of the LCD backlight via the power supply control circuit 76 in order to prevent the deterioration of the LCD characteristics. Another way is available to prevent the deterioration of the LCD characteristics; the controller 79 does not control the video modification circuit 71, but generates the OSD signal, and displays the OSD signal with an appropriate intensity and moving on the LCD.

When the signal selection circuit 70 selects the video and audio signals taped off from the output device 66 of the playback apparatus, and at the same time when the playback apparatus 75 is in a stop or halt mode, the controller 79 recognizes the playback apparatus is in a stop or halt mode, and counts the duration time thereof, and if the duration time exceeds the predetermined time, the controller 79 controls the power supply control circuit 76 to have its controllable circuits of each block be in specified power supply status. As a result, the power supplied to each system element is minimized thereby saving power.

When the playback apparatus reproduces only an audio signal and does not include a video signal, the controller 79 recognizes that the output of the output device 66 only reproduces the audio signal. Thus, the controller 79 minimizes the power supplied to the circuits and apparatus other than those related to the audio signal, thereby saving power.

Exemplary Embodiment 8

Exemplary Embodiment 8 adopts a CRT projector as the playback control apparatus. In FIG. 6, the LCD is replaced with the CRT projector, then the structure can be used for Exemplary Embodiment 8. The present invention can not only prevent a burn-out of CRT phosphor, but also prevent a deterioration of lens coating due to over heating.

The signal selection circuit 70 selects the video and audio signals tapped off from the output device 66 of the playback apparatus, and at the same time the playback apparatus is in the stop mode, or power-off mode where blue color only is tapped off as a video output. In this case, the controller 79 recognizes that the playback apparatus is in the operation mode of tapping off the blue color only, and counts a duration time of the blue color. If the duration time exceeds the predetermined time, the controller 79 controls the video modification circuit 71 to apply a blanking or lower contrast in order to prevent the deterioration of lens coating due to heat from the CRT surface.

The controller 79 generates the OSD signal, and composites it with a video signal in the video modification circuit, thereby the controller gives the operator an notice that the CRT projector is in a protection status.

The controller 79 on the other hand controls the OSD signal instead of controls the video control circuit 71, and displays the OSD signal with an appropriate intensity and moving on the CRT in order to prevent the deterioration of the lens coating.

While the present invention has been described with regard to a monitor apparatus, it is also applicable to a TV used together with a playback apparatus.

The present invention prevents burn-out of the CRT phosphor or prevents the deterioration of phosphor characteristics by controlling the display device, which is used together with a playback apparatus such as an optical disk, and the like, responding to the playback signal tapped off from each playback apparatus. The first controller which controls each playback apparatus, and the second controller which controls the display device, communicate with each other, and thus both controllers recognize playback status as well as display status and control the video control circuit which controls a contrast, etc. Thus, both the controllers optimize the status of the video display, audio output, power supply control, playback apparatus control. As a result, burn-out of the CRT phosphor and deterioration of the phosphor are prevented, and also unnecessary circuits are controlled to save energy.

What is claimed is:

1. A playback control apparatus for use with a) a playback unit which reproduces a signal which is at least one of an audio signal and a video signal, and b) a receiver unit which converts said signal into at least one of sound and picture, respectively, said playback control apparatus comprising:

a first control unit for controlling the playback unit; and for generating a status signal which corresponds to playback status of said playback unit;

a modification unit for modifying at least one of said audio signal and said video signal, a second control unit for signaling said modification unit to modify at least one of said audio signal and said video signal responsive to said status signal from said first control unit, and said second control unit measures a duration time of the playback status and controls said modification unit to modify said video signal when the duration time of the playback status exceeds a predetermined time.

2. A playback control apparatus according to claim 1, further comprising a signal selection circuit for selecting at least one of said video signal and said audio signal for transmission to said second control unit, said signal selection circuit being controlled by said second control unit.

3. A playback control apparatus according to claim 1, further comprising a power supply control circuit for controlling supply of power to at least a portion of said playback control apparatus, said power supply control circuit being controlled by said second control unit.

4. A playback control apparatus according to claim 1, wherein at least one of: a) modification of said video signal by said modification unit is controlled by said second control unit responsive to playback status of said playback unit, and b) modification of said audio signal by said modification unit is controlled by said second control unit responsive to playback status.

5. A playback control apparatus according to claim 1, wherein a picture contrast produced by said modification unit is controlled by said second control unit responsive to playback status.

6. A playback control apparatus according to claim 1, wherein said control unit generates an On Screen Display (OSD) signal, and said modification unit is controlled by said second control unit to combine the OSD signal and the video signal.

7. A playback control apparatus according to claim 1 further comprising: an OSD signal generation circuit which is controllable by said second control unit, and a composition circuit for combining the video signal and the OSD signal.

8. A playback control apparatus according to claim 1 further comprising: an OSD signal generation circuit which is controllable by said control unit, and a video Blanking (BLK) circuit which is controllable by said second control unit, wherein said modification circuit combines a video signal tapped off from said video BLK circuit and the OSD signal generated by said OSD signal generation circuit.

9. A playback control apparatus according to claim 1, further comprising a video Blanking (BLK) circuit, wherein said second control unit generates an OSD signal, and said modification unit is controlled by said second control unit in at least one of changing contrast and combining the video signal and the OSD signal.

10. A playback control apparatus comprising:
    a playback apparatus,
    a reproduction device,
    a first control unit for controlling said playback apparatus which reproduces at least one of a video signal and an audio signal and for generating a status signal which corresponds to playback status of said playback unit,
    a modification unit for modifying at least one of the video signal and the audio signal,
    a second control unit for signaling said modification unit to modify at least one of said audio signal and said video signal responsive to said status signal from said first control unit, and said second control unit measures a duration time of the playback status and controls said modification unit to modify said video signal when the duration time of the playback status exceeds a predetermined time,
    a power supply control circuit which is controlled by said second control unit and which regulates supply of power to at least a portion of said playback control apparatus, and
    a signal selection circuit which selects at least one of the video signal and the audio signal and which is controlled by said second control unit.

11. A playback control apparatus according to claim 10, wherein said modification unit is controlled by said second control unit responsive to playback status of said playback apparatus.

12. A playback control apparatus according to claim 10, wherein said modification unit is controlled by said second control unit based upon playback status of said playback apparatus to vary contrast of said picture.

13. A playback control apparatus according to claim 10, wherein said second control unit generates an On Screen Display (OSD) signal, and controls said modification unit to combine the video signal and the OSD signal.

14. A playback control apparatus according to claim 10, further comprising: (a) an On Screen Display (OSD) signal generation circuit which is controlled by said second control unit, and (b) a combining circuit for compositing the video signal and the OSD signal.

15. A playback control apparatus according to claim 10, further comprising: an On Screen Display (OSD) signal generator which is controlled by said second control unit, and
    a video Blanking (BLK) circuit which is controlled by said second control unit, wherein said modification unit combines the video signal tapped off from said video BLK circuit and the OSD signal generated in said OSD circuit.

16. A playback control apparatus according to claim 10, further comprising a video Blanking (BLK) circuit which is controlled by said second control unit, wherein said second control unit generates an On Screen Display (OSD) signal, and said second control unit controls said modification unit to change contrast of said picture and to combine the video signal and the OSD signal.

17. A playback control apparatus comprising:
    a playback apparatus,
    a display device,
    a first control unit for controlling said playback apparatus which reproduces at least one of a video signal and an audio signal, and for generating a status signal which corresponds to playback status of said playback unit,
    a modification unit for modifying at least one of the video signal and the audio signal,
    a second control unit for signaling said modification unit to modify at least one of said audio signal and said video signal responsive to said status signal from said first control unit, and said second control unit measures a duration time of the playback status and controls said modification unit to modify said video signal when the duration time of the playback status exceeds a predetermined time,
    a power supply control circuit which regulates supply of power to at least a portion of said playback control apparatus.

18. A playback apparatus according to claim 17, further comprising a signal selection circuit which selects at least one of the video signal and the audio signal and which is controlled by said first control unit.

19. A playback control apparatus according to claim 17, wherein said first control unit controls said modification unit responsive to playback status of said playback apparatus.

20. A playback control apparatus according to claim 17, wherein said first control unit controls said modification unit responsive to playback status of said playback apparatus to vary contrast of said picture.

21. A playback control apparatus according to claim 17, wherein said first control unit controls said modification unit to change contrast of said picture and to combine the video signal and an On Screen Display (OSD) signal.

22. A playback control apparatus according to claim 17, further comprising: an On Screen Display (OSD) signal generation circuit which is controlled by said first control unit, and
    a composition circuit for combining the video signal and the OSD signal generated by said OSD signal generation circuit.

23. A playback control apparatus according to claim 17 further comprising:
    an OSD signal generation circuit which is controllable by said first control unit, and
    a video Blanking (BLK) circuit which is controllable by said first control unit, wherein said modification unit combines a video signal tapped off from said video BLK circuit and the OSD signal generated by said OSD signal generation circuit.

24. A playback control apparatus according to claim 17, further comprising a video Blanking (BLK) circuit, wherein said first control unit generates an OSD signal, and said modification unit is controlled by said first control unit to vary contrast of said picture and to combine the video signal and the OSD signal.

25. A playback control apparatus for use with a plurality of playback units which reproduces a signal which is at least one of an audio signal and a video signal, and a receiver unit which converts said signal into at least one of sound and picture, respectively, said playback control apparatus comprising:

a first control unit for controlling the plurality of the playback units, and for generating at least one status signal which corresponds to playback status of said playback unit, a modification unit for modifying at least one of said audio signal and said video signal, a second control unit for signaling said modification unit to modify at least one of said audio signal and said video signal responsive to said status signal from said first control unit, and said second control unit measures a duration time of the playback status and controls said modification unit to modify said video signal when the duration time of the playback status exceeds a predetermined time.

* * * * *